United States Patent Office 3,003,628
Patented Oct. 10, 1961

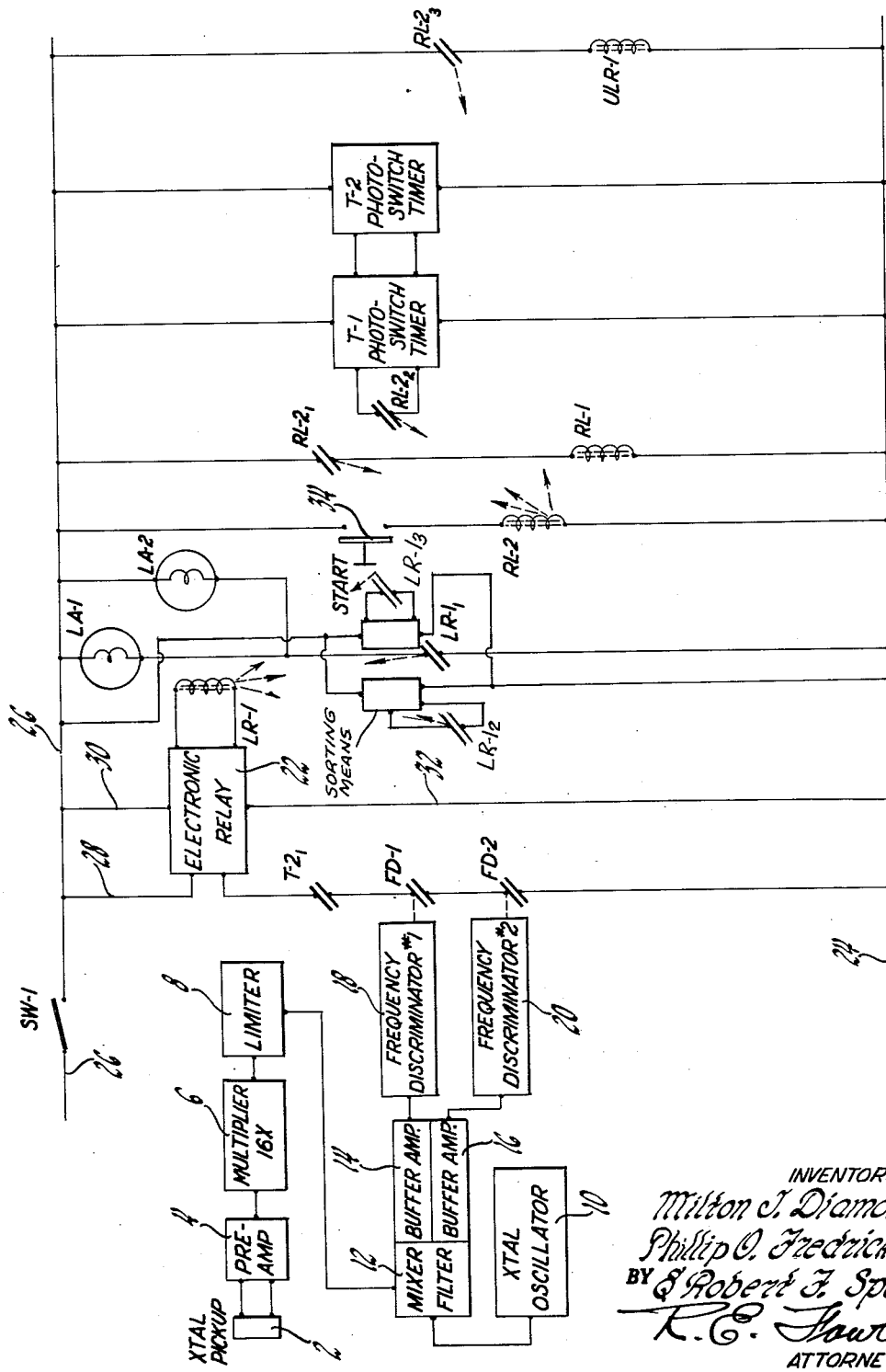

3,003,628
SONIC INSPECTION APPARATUS
Milton J. Diamond, Saginaw, Phillip O. Fredrickson, Clawson, and Robert F. Spain, Royal Oak, Mich., assignors to General Motors Corporation, Detroit, Mich., a corporation of Delaware
Filed Oct. 16, 1956, Ser. No. 616,267
6 Claims. (Cl. 209—72)

This invention relates to testing means and more particularly to means for testing production parts for soundness or flaws.

Prior to utilizing parts in production assembly operations, it is necessary to test them to ascertain whether they have any occlusions, flaws, or cracks which will make them unfit for use or which at some later time may cause failure of the machine into which they are to be assembled, necessitating expensive repairs. Parts formed of metal and some other substances, even though they are of irregular shape, have a natural period of resonance and can be made to resonate if they are supported and struck a blow. When a part has been designed and fabricated, the natural frequency at which it will vibrate in any given position and point of support can be determined. Any flaw, occlusion, or crack in the part, even if invisible to the eye, will vary the resonant frequency of an identical part when similarly supported and, therefore, this characteristic may be used for the testing and sorting of parts of a given configuration prior to use. One testing system of this general order is shown and described in application for United States Letters Patent Serial No. 533,482, filed September 9, 1955, by Milton F. Diamond et al., entitled "Electronic Flaw Detector," assigned to a common assignee. That application discloses a testing arrangement in which the resonant vibrations of a part are picked up by a transducer, amplified, and the amplified signals applied to two discriminator units respectively, adjusted to frequencies at the high and low end of an acceptable range of frequency deviation defining a satisfactory range. Switching means operated by both discriminators classify the part. The switching means are themselves connected in series in a control circuit and, as long as they both stay closed, means will be energized to indicate a satisfactory casting or part. If the frequency is either above or below the acceptable range, one of the switching means will open, indicating an unsatisfactory casting.

If the parts to be tested are supported in a certain manner, the resonant frequency may be relatively high, e.g. 5000 cycles, and a frequency band of some range will indicate satisfactory parts, e.g. 200 cycle variation. Anything outside of that range would indicate a flaw, crack, or occlusion, and the part would not be satisfactory. However, the parts may be supported in a number of different manners for various reasons. It has been found that where the resonant frequency is low, only a very few cycles or perhaps a fraction of cycle is the permissible range. For example, in supporting a certain part in a horizontal plane a resonant frequency of 370 cycles was obtained but any variation of more than one cycle was found to indicate a defective part. In order to provide testing apparatus which could accurately determine a variation of one cycle in the resonant frequency of parts being tested, the current system has been designed.

It is, therefore, an object in making this invention to provide a means for testing and sorting a plurality of parts of the same configuration on the basis of sound and unsound characteristics.

It is a further object in making this invention to provide testing means for sorting satisfactory from unsatisfactory parts by a resonant method.

It is a still further object in making this invention to provide a resonant system for testing means for sorting parts of the same configuration which differentiates between parts resonating over a very small frequency range.

With these and other objects in view, which will become apparent as the specification proceeds, our invention will be best understood by reference to the following specification and claims and the illustrations in the accompanying drawing in which:

The drawing is a block and circuit diagram of a testing system embodying our invention.

Referring more specifically to the drawing, there is shown therein a transducer 2 which may be any type of pick-up for changing the mechanical vibrations of a part into electrical oscillations. This pick-up 2 may bear directly against the part being tested or may take the form of a microphone which picks up the vibrations of the part through the air. The electrical oscillations produced by the transducer 2 are fed into a preamplifier 4 where they are amplified. The output of the preamplifier is in turn applied to a frequency multiplier 6 which, for example, may multiply the frequency sixteen times. Such a frequency multiplier is based on known principles such as the basic discussion of harmonic generators in Radio Engineering by Terman, third edition, published 1947, at pp. 394 to 397. The amplified and multiplied voltage is then passed through a limiter 8 which limits all of the waves to the same amplitude.

A local oscillator 10 is provided which produces waves of a given frequency which it is desired to heterodyne or beat with oscillations from the pick-up 2. The outputs of limiter 8 and the oscillator 10 are both, therefore, connected to a mixer, filter stage 12 where the two outputs are mixed together. A pair of buffer amplifiers 14 and 16 are both connected to the output of the mixer stage 12 and one feeds frequency discriminator 18 identified as discriminator No. 1, and the other feeds frequency discriminator 20 identified as discriminator No. 2. Frequency discriminator No. 1 actuates switching means FD-1 and discriminator No. 2 actuates a similar switching means FD-2. Both of these switches are connected in series and with a further switch $T-2_1$, which three jointly control an electronic relay 22.

A pair of power lines 24 and 26 connected to any suitable source of power are provided such as 110 v. alternating current. A switch SW-1 is connected in power line 26 and controls the energization of the lines. The electronic relay 22 has one terminal of its input connected to power line 26 through line 28 to the right of switch SW-1 and another input terminal connected through switches $T-2_1$, FD-1 and FD-2 in series to the other power supply line 24. The output of the electronic relay 22 is connected to a relay coil LR-1 and energizes the same during appropriate periods. A second pair of supply lines 30 and 32 are connected across power lines 26 and 24 to supply continuous power to certain portions of the electronic relay. An indicating light LA-1 is connected in series with switch contacts $LR-1_1$ across the power lines 26, 24. The switch contacts $LR-1_1$ are operated by the relay coil LR-1 as indicated by the dash arrows extending between the two. A second indicating light LA-2 is connected in parallel with LA-1 and is illuminated simultaneously thereof at another portion of the apparatus. If it is desired to control sorting or classifying apparatus simultaneously with the receipt of an indicating signal or independently, additional switches may be actuated by the relay coil LR-1 such as $LR-1_2$ and $LR-1_3$ which are connected to sorting relay apparatus as indicated.

A manually operated spring-biased starting switch 34 is connected in series circuit with a relay coil RL-2 across the power lines 26, 24. Relay coil RL-2 controls three sets of contacts RL-2₁, RL-2₂, and RL-2₃, as indicated by the dash arrows. Relay contacts RL-2₁ are connected in a series circuit with relay coil RL-1 across the power lines 26 and 24. A pair of timer switches T-1 and T-2 are connected in parallel circuits across the power lines 26, 24 and are so interconnected that the energization of T-1 controls the energization of T-2. In the control circuit for the switch timer T-1, there is located a pair of switch contacts RL-2₂ to control the timer. This switch timer is operated to, in turn, control the switch timer T-2. Lastly, a pair of relay contacts RL-2₃ is connected in series with a solenoid operating coil ULR-1 across the power lines 24 and 26. The relay LR-1 is a mechanically latched-in relay and once the coil has been energized, it maintains the switches LR-1₁, LR-1₂, and LR-1₃ closed. In order to reset the relay, the coil ULR-1 is energized to unlatch the same. As indicated above, the part to be tested is supported in some suitable manner and struck a blow. This sets the part into vibration, which vibration is picked up by the pick-up 2. If the resonant frequency of the part falls within suitable limits, that part is considered satisfactory and identification of the part is applied thereto either by sorting or applying some identifying mark.

The operaion of the system disclosed in the drawing is as follows:

The operator manually closes switch SW-1 to apply power to the system and time is permitted to allow the various components to warm up. After the tubes are satisfactorily energized, the starting switch 34 is depressed. This energizes relay coil RL-2 through an obvious circuit and it closes switches RL-2₁, RL-2₂, and RL-2₃. The closure of switch RL-2₁ energizes solenoid RL-1 which actuates a ringing mechanism to strike the part and cause it to resonate. The closure of switch RL-2₂ starts timer switch T-1 to time out. At this time switch T-2 is not energized and switch contacts T-2₁ are open. The closure of switch RL-2₃ energizes coil ULR-1 which unlatches relay LR-1 and allows it to open which resets the whole system. When timer switch T-1 times out, it closes a circuit to energize timer switch T-2 which immediately closes its contacts T-2₁ completing the energizing circuit for the electronic relay 22. This initial delay in closure of the switch contacts T-2₁ permits the crest of the resonant wave to dissipate prior to utilizing said wave at the output of the two discriminators. If now during the timing period of T-2 the frequency applied to the pick-up 2 is within a satisfactory range and discriminator No. 1 and discriminator No. 2 both cause their contacts FD-1 and FD-2 to close, then the electronic relay 22 will be energized to energize relay coil LR-1 latching in the switches. This energization closes switch contacts LR-1₁ which causes the lamps LA-1 and LA-2 to be energized, indicating a satisfactory casting. Coil LR-1 may also operate other switches such as LR-1₂ and LR-1₃ in control circuits to either mechanically sort or apply an identifying mark to the satisfactory castings. The discriminator No. 1 is so adjusted as to open switch contacts FD-1 at any frequency above a predetermined limit frequency and discriminator No. 2 will be so adjusted as to open its contacts FD-2 at any frequency below a certain lower limit frequency. Between the two frequency limits, both switches FD-1 and FD-2 remain closed. When timer T-2 times out, it opens contact T-2₁ but the latched-in contacts LR-1₁, LR-1₂, and LR-1₃ remain closed until switch 34 is closed for the next testing cycle.

If there is only a limited frequency difference between the good and bad castings, for example, in some cases it has been found that the range may be only one cycle and anything differing more than one cycle from the satisfactory frequency indicates a poor or defective casting. We have provided means for expanding the range of the discriminators so that they may select with only this limited basic range. Connected to the preamplifier there is a frequency multiplier section which, for example, may multiply the resonant frequency from the pick-up 2 by sixteen. The output of the multiplier heterodynes with the output of a local oscillator 10 to provide a given frequency difference. Thus, where there was only a one cycle differentiation before signal application to discriminator 1 and discriminator 2, there are now provided sixteen cycles difference which is a much more usable and satisfactory identifying range for selection between the good and poor castings. The limiter section 8 removes any difference between the amplitudes of individual cycles and establishes a strict frequency selection difference.

By this method we have been able to differentiate between good and poor castings where there is only a slight original frequency difference to provide the classification.

We claim:

1. In testing apparatus for controlling means for classifying parts having a resonant frequency of vibration, a plurality of switches connected in series with said controlling means to commonly control the energization of the same, timing means for actuating one of the switches to close the same a predetermined time after the apparatus is energized and open it again at a predetermined later time, a plurality of frequency discriminators adjusted to different spaced center frequencies to define limits connected to and individually operating the remainder of the switches, transducer means for changing mechanical vibrations of a part into electrical oscillations for picking up the vibration of a part and amplifying means interconnecting said transducer means and the discriminators to apply the resonant frequency thereto for control purposes for a given time period.

2. In testing apparatus for controlling means for classifying parts, a plurality of switching means in series with the controlling means to control the latter, a plurality of discriminators connected to individually actuate the switching means to provide range limits for the frequencies of current applied thereto, a transducer to pick up resonant waves from a part to be tested, frequency multiplier means connected to said transducer to expand the frequency range indicating approval and means coupling said multiplier output to the plurality of discriminators to produce a classifying signal.

3. In testing apparatus for selectively classifying parts having a resonant frequency of vibration representative of part soundness, transducer means for changing mechanical vibrations picked up from a part which is resonating into electrical oscillations, frequency multiplying means connected to the transducer means, a local oscillator for supplying a fixed frequency, mixing means connected to the local oscillator and to the frequency multiplying means to combine the two frequencies produced and provide a difference frequency, a plurality of frequency discriminator circuits connected in parallel to the mixing means and adjusted to different spaced center frequencies representative of satisfactory upper and lower limits for the resonant frequencies, a plurality of switch means actuated by the frequency discriminator circuits, control switching means and conductive means connecting said plurality of switch means and said control switching means to provide control for said control switching means.

4. In testing apparatus for selectively classifying parts having a resonant frequency of vibration representative of part soundness, transducer means for changing mechanical vibrations picked up from a part while it is resonating into electrical oscillations, frequency multiplying means connected to the transducer means, limiting means connected to the output of the frequency multiplying means to limit the amplitude of the oscillations, a local oscillator for generating fixed frequency oscillations, mixing means connected to the local oscillator and the limiter to combine the frequencies of the two and produce a difference frequency, a first discriminator circuit connected to the mixing means, first switching means connected therewith and adjusted to be actuated at a certain frequency representative of an upper frequency limit of the resonant frequency of the part, a second discriminator circuit connected to the mixing means, second switching means connected therewith and adjusted to operate at a different spaced frequency representative of a lower limit of the resonant frequency of the part, and means connected in series circuit with both first and second switching means for controlling desired apparatus so that frequencies between the two operating points of the two switching means provide energization of the last named means controlling apparatus but any frequency above the frequency of the first discriminator or below the second, will not energize the means for controlling apparatus.

5. In testing apparatus for selectively classifying parts having a resonant frequency of vibration, transducer means for changing mechanical vibrations picked up from a part into electrical oscillations, frequency multiplying means connected to the transducer means, limiting means connected to the output of the frequency multiplying means to limit the amplitude of the oscillations, a local oscillator for generating fixed frequency oscillations, mixing means connected to the local oscillator and the limiter to combine the frequency of the two and produce a difference frequency, a first discriminator circuit connected to the mixing means and adjusted to a certain center frequency representing an upper frequency limit, a second discriminator connected to the mixing means and adjusted to a center frequency representing a lower limit, a first and second switching means controlled by the first and second discriminators, means controlling desired apparatus connected to said first and second switching means so that frequencies between the range of the two discriminator circuits will provide operation of one order but any frequencies above the frequencies of the first discriminator circuit or below that of the second discriminator circuit will provide another, and indicating means connected in circuit with the first and second switching means and controlled thereby to indicate the frequency range.

6. In testing apparatus for controlling means for classifying parts having a resonant frequency of vibration, controlling means, a plurality of frequency discriminator circuits adjusted to different center frequencies representative of the frequency tolerance limits of the resonant frequency of vibration of a part, independent switching means actuated by each of the discriminator circuits, said controlling means being connected in circuit with the independent switching means and controlled thereby, a plurality of sources of oscillating current one of which is proportional to the resonant frequency of vibration of the part and the other of fixed frequency, frequency multiplying means connected to the source of oscillating current proportional to the resonant frequency of the part, mixing means connected to the fixed frequency source and to the frequency multiplying means to mix the outputs and to form a difference frequency wave, said last named means being connected to said frequency discriminator circuits to apply said difference frequency wave commonly thereto to in turn control the controlling means.

References Cited in the file of this patent
UNITED STATES PATENTS

| | | |
|---|---|---|
| 2,112,621 | Henszey et al. | Mar. 29, 1938 |
| 2,337,328 | Hathaway | Dec. 21, 1943 |
| 2,415,177 | Hurley | Feb. 4, 1947 |
| 2,423,103 | Koechein | July 1, 1947 |
| 2,791,328 | Beardsley | May 7, 1957 |